Oct. 27, 1964
B. VER NOOY
3,154,106
PIPELINE PLUGGER
Filed Oct. 10, 1960
4 Sheets-Sheet 2
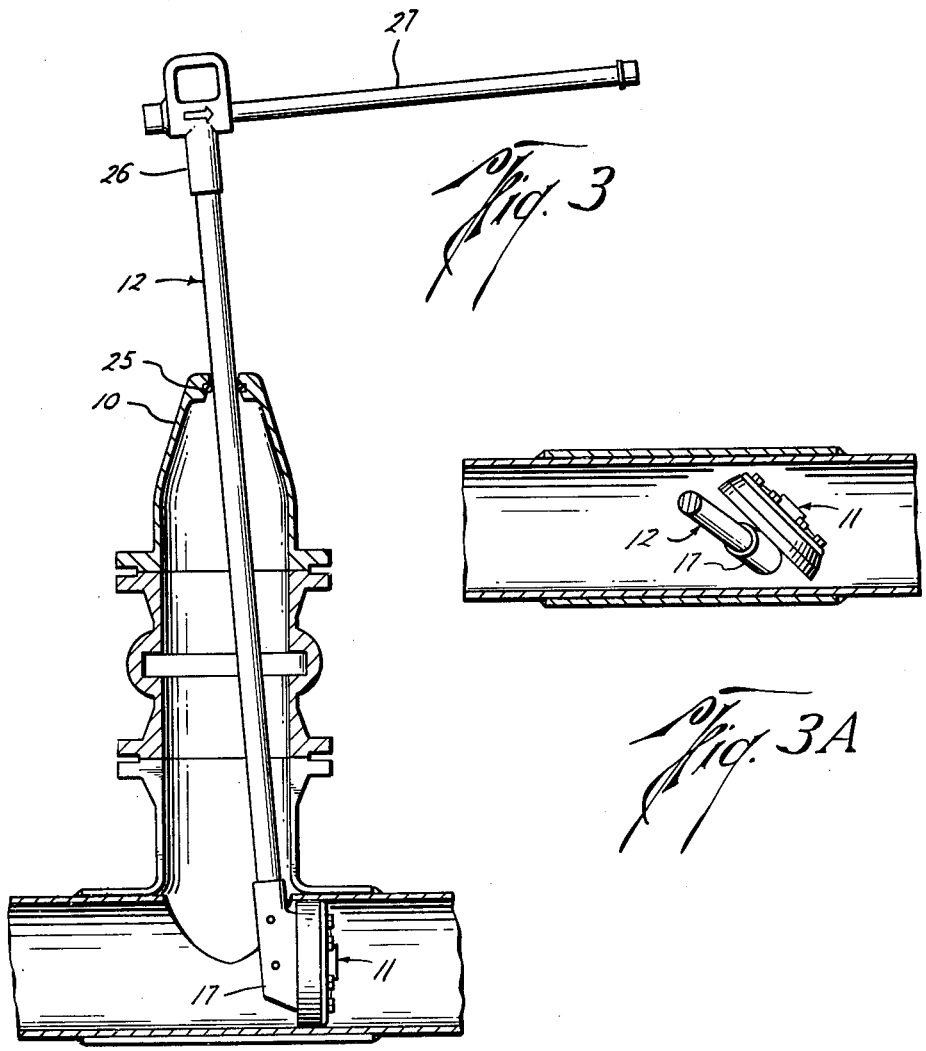
Burton Ver Nooy
INVENTOR.
BY
ATTORNEYS

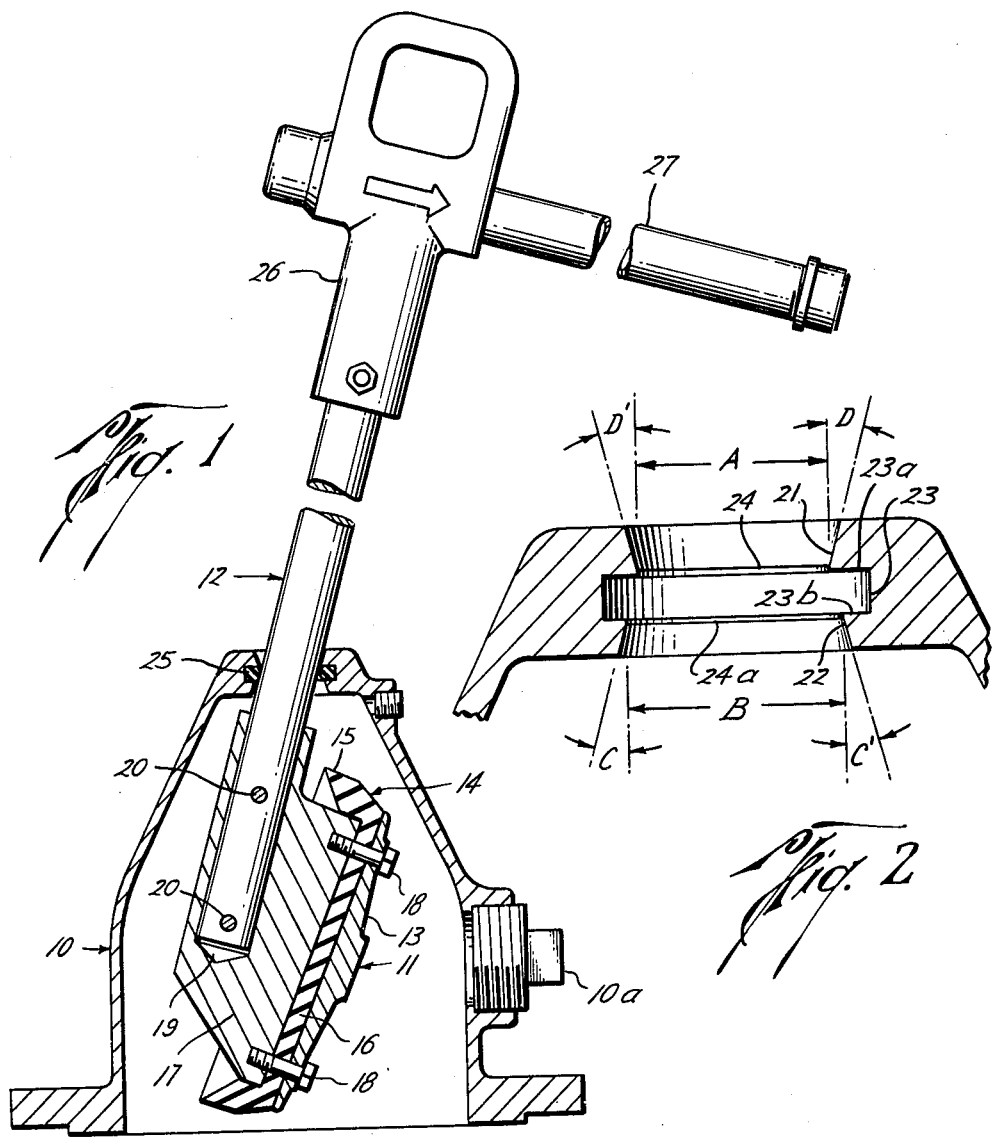

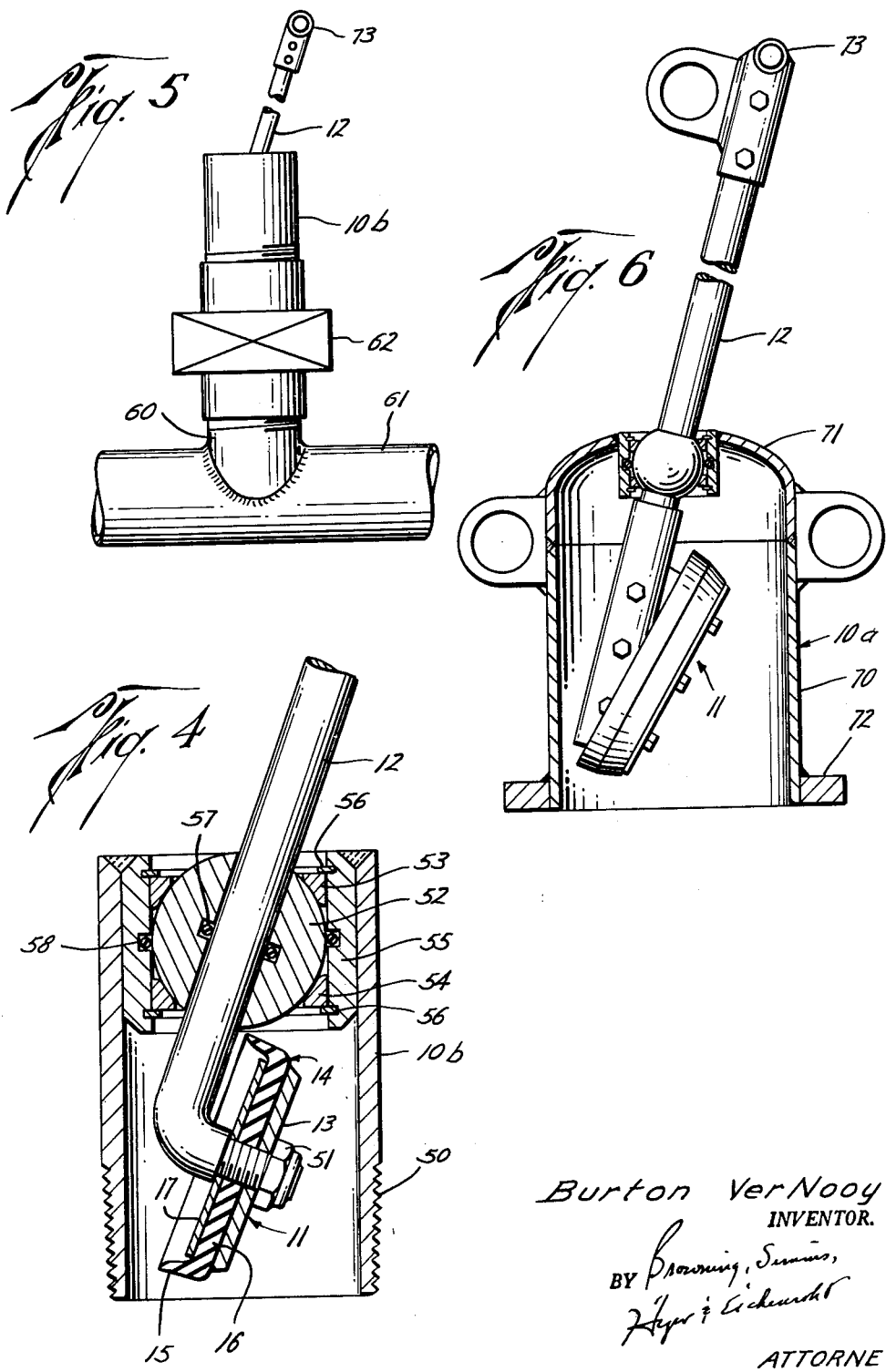

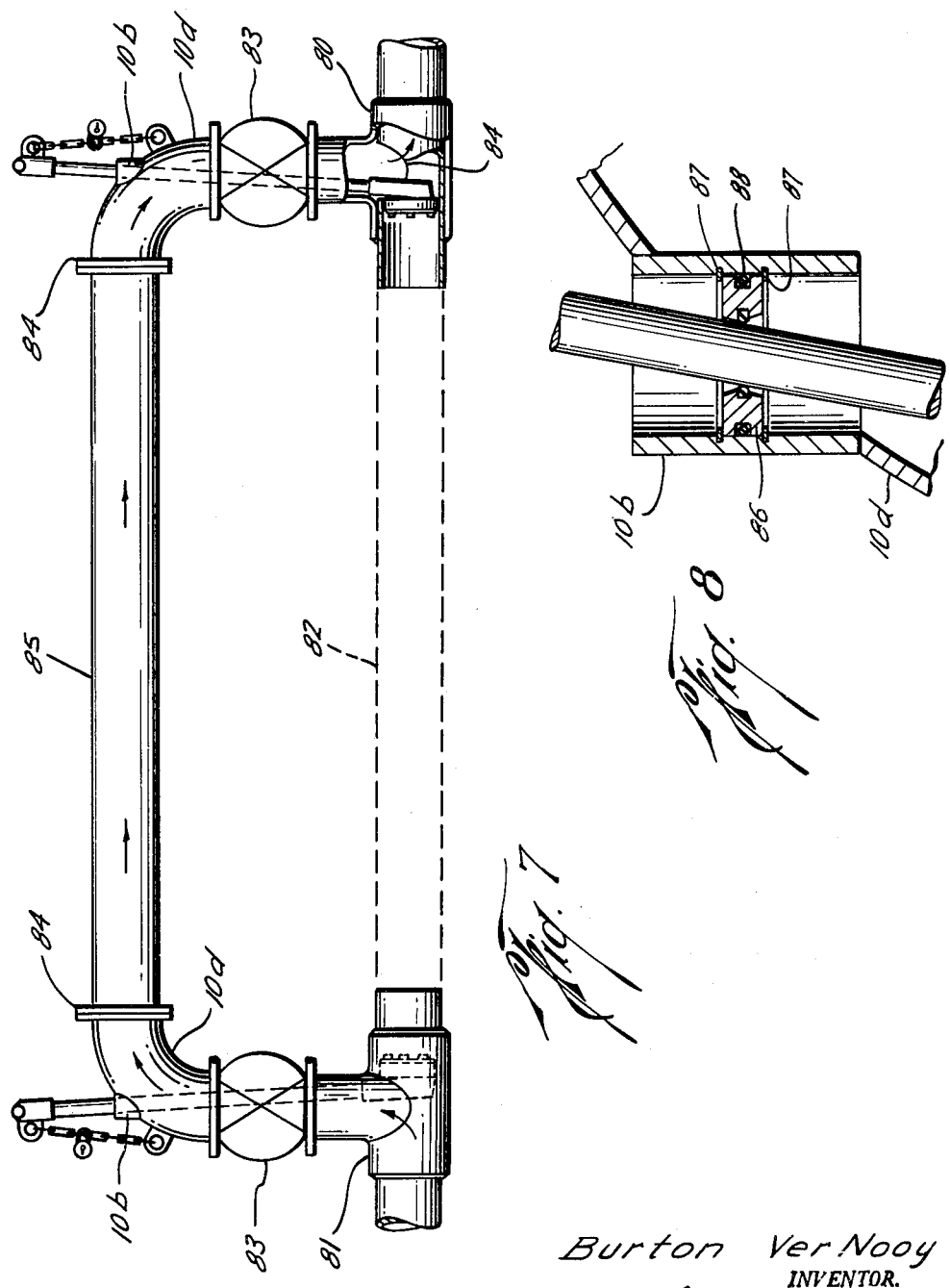

United States Patent Office 3,154,106
Patented Oct. 27, 1964

3,154,106
PIPELINE PLUGGER
Burton Ver Nooy, Tulsa, Okla., assignor to T. D.
Williamson, Inc., Tulsa, Okla.
Filed Oct. 10, 1960, Ser. No. 61,429
10 Claims. (Cl. 138—94)

This invention relates to a pipeline plugger of the type which in operation causes a plug means to move from a housing at one side of the pipeline through a side opening in the pipeline and then laterally along the pipeline to a seated position across the pipeline to one side of the side opening.

In the art of pipeline operation, pipeline pluggers have been extensively used to close off a section of the pipeline wherein it is desired to make certain changes. For example, if the pipeline should develop a leak, it is conventional to hot-tap into the pipeline on either side of the leak and then to install a bypass loop of pipe around the section to be repaired. A split T or nipple is then welded to the pipeline on either side of such section between it and the junctures of the bypass loop with the pipeline. A tapping valve is then attached to the T, a hot tapping machine mounted on the tapping valve and then the tapping machine operated to tap into the pipeline. Thereafter, the tapping machine is dismounted with the tapping valve closed and the plugger mounted on the tapping valve. The latter is then opened and the plugger operated to advance the plug into the pipeline to form a fluid barrier therein. This practice not only permits continuing use of the pipeline during repair, but also avoids the necessity of draining long sections of the pipeline to the nearest block valves on either side of the leaky section in order to make the repair.

Other uses for pipeline pluggers are known to those skilled in the art and need not be described.

In my prior applications, Serial No. 669,380, filed July 1, 1957 (now U.S. Patent 2,906,295); Serial No. 539,487, filed October 10, 1955 (now U.S. Patent 2,812,778) and Serial No. 799,730, filed March 16, 1959, now U.S. Patent 3,025,885, there are disclosed pluggers of the general type referred to above, i.e., those involving the seating of a plug means to one side of a side opening in a pipe. These disclosed pluggers, while operating very effectively, present problems in their manufacture for sale in a low cost market and it is an object of this invention to provide pluggers of this type which are of simplified design so that they can be manufactured more economically. Further, the design is such that the pluggers can be of lesser overall weight, thereby facilitating their installation and movement from job to job.

Another object is to provide such a plugger which is particularly adapted to be designed for use in low pressure pipelines, especially those of smaller sizes. As a result, the plugger finds special application in municipal gas and water distribution systems where previous pluggers have not been widely used due to their expense, weight and size. However, it is to be understood that the plugger of this invention can be adapted for use in larger size pipelines at relatively higher pressures, although it is probably not so well suited for this use as are the pluggers described in my prior applications.

Another object of the invention is to provide such a plugger in which movement of an operating or plug carrier rod causes a substantially identical movement of a plug means so that by observation of the movement of the carrier rod, movement of the plug means can be readily ascertained.

Another object of the invention is to provide such a plugger with which any pressure differential existing across the plug means while the latter is in seated position can be decreased to facilitate withdrawal of the plug means simply by turning the carrier rod to thereby allow fluid to bypass the plug means.

Another object of the invention is to provide such a type of plugger constructed so that it can be mounted upon a pipeline without first rotating its fluid tight housing about its axis into a specific orientation with respect to the pipeline and yet the plug means can be landed in seated position. In pluggers such as that shown in my Patent 2,906,295, the plugger housing must be rotated, prior to mounting, until the plug faces either upstream or downstream of the pipeline so that the plug can be properly landed in the latter. Unless this orientation is properly done, the plug will not seat properly and in some cases, even the flanges on the T or tapping valve to which the plugger is attached must likewise be oriented during their installation to assure proper alignment of the plugger. In the instant plugger, the fluid tight housing can be attached to the pipeline without any particular rotative orientation thereof and the plug properly oriented for landing simply by turning the carrier rod. Also, the plugger, once installed can be made to seal against pressure from either direction simply by landing the plug means on one side or the other of the side opening. This is useful when progressively pressure testing sections of pipeline.

Other objects, advantages and features of the invention will be apparent to one skilled in the art upon consideration of the specification, claims and drawings wherein:

FIG. 1 is a view, partially in section and partially in elevation, showing a preferred embodiment of a plugger constructed in accordance with this invention and one which is particularly suited for use with larger sizes of pipeline;

FIG. 2 is a sectional view on an enlarged scale of the top of the housing of FIG. 1 showing a preferred configuration of the mounting means for the rod which carries the plug means of FIG. 1, the view omitting the rod and seal for clarity;

FIG. 3 is a view showing the plugger of FIG. 1 mounted on a tapping valve on a pipeline with the plug means landed in seated position;

FIG. 3A is a view showing the plug means in landed position but tilted or cocked so that fluid can bypass it to equalize pressures thereacross and thereby facilitate withdrawal of the plug means;

FIG. 4 illustrates another embodiment of the plugger, which embodiment is especially suited for use in connection with smaller sizes of pipeline and shows another mounting and sealing means for the carrier rod;

FIG. 5 illustrates a manner of mounting the plugger of FIG. 4 on a pipeline;

FIG. 6 is still another view of another form of plugger;

FIG. 7 shows yet another form of plugger and also illustrates its use in repairing a section of the pipeline while flow is bypassed around the section being repaired; and FIG. 8 is an enlargement of the rod mounting means of FIG. 7 and shows a somewhat different arrangement from those of the other figures.

Like characters of reference will be used throughout the several views to designate like parts.

Referring now to FIGS. 1 to 3, the pipeline plugger generally comprises a housing 10, a plug means 11, and a carrier rod or shaft 12 rigidly connected to the plug means and mounted in the housing so that the plug means can be moved from its retracted position within the housing 10 as shown in FIG. 1 to a seated position in a pipeline laterally to one side of an opening in the pipeline as shown in FIG. 3. The term "rigidly" as used herein in referring to the connection between the rod and plug means embraces not only a connection which prevents all relative movement between the plug means and rod, but also one in which the plug may tilt or move a few degrees with respect to the rod, but not enough that for practical purposes, any given movement of the rod does not result in a substantially identical movement of the plug means.

The plug means preferably includes a rigid central body portion shown in FIG. 1 as back-up plate 13. This body portion is of a diameter such that it will extend substantially across the entire cross section of the pipeline to provide a rigid back-up for the peripheral seal means 14. The latter is shown here as comprising a lip type seal having an annular lip 15 integral with a central body portion 16. The seal means can be made of rubber or other resilient material and preferably, the central body portion 16 is reinforced with layers of cloth, light screen or other reinforcing material.

The plug means also includes a supporting body portion 17. This body portion has the seal means and the back-up plate 13 connected thereto by suitable means such as by studs 18. It will be noted that the central body portion 16 of the seal means can be clamped between the back-up plate 13 and the supporting body portion 17 so as to provide a fluid tight seal therebetween and also to cause the body 16 to sealingly engage the studs 18. This prevents fluid leakage past the studs through the openings in plate 13 receiving the studs.

The seal means can take other forms than the lip type seal shown in FIG. 1. For example, it can be an O-ring disposed in a groove in the periphery of the plug body. However, in any event, the seal means should be of the fluid energized type; that is, the seal is of a size and structure that when the plug is initially seated, there will be an interference or mechanical type seal between the seal means and the pipeline. Then, as the fluid pressure differential is increased across the seal, the seal responds thereto in that the pressure differential acts to urge the seal into tighter and tighter engagement with the pipe wall as the differential increases.

It will thus be seen that the preferred plug means is in the form of a disc adapted to be seated across the pipeline and, as will be described below, to be rotated or cocked about an axis so that the seal with the pipeline is broken and fluid can bypass the plug means while it is landed.

The carrier rod or shaft 12 is rigidly connected to the plug means as by being received in a counterbore 19 and bolted therein as by studs 20. With such arrangement, any movement of rod 12 will result in an identical movement of the plug means so that by observation of the movement of the rod, the corresponding movement and position of the plug can be readily determined.

As will be seen from FIG. 1, the plane of the plug is at a small angle with respect to the rod 12. This angular relationship is employed when (1) it is desired that the plug, in seated position, extend at right angles across the pipeline and (2) the arrangement is such that the rod is at a substantial angle with the longitudinal axis of the housing when the plug is in seated position. Thus, for right angle seating of the plug, the angle at which the plug is cocked with respect to the rod is equal to the angle of the rod with respect to the longitudinal axis of the housing when the rod is in plug seating position. Of course, such angle will be dependent upon a number of factors such as the distance from the lower end of the rod to the plane of the plug, the distance the seated plug is offset from the longitudinal axis of the housing, the distance from the rod's pivot point to the pipeline center line, etc. Thus, in FIGS. 1 and 3, these factors are such that the plug is cocked as shown in order that it can seat at right angles. In FIG. 4, however, the factors are such that the plug is not cocked and yet seats at right angles. While it is not necessary that the plug seat at right angles (e.g. the seal means is sufficiently flexible to permit some cocking of the plug when in seated position or the plug is of an ellipsoidal shape to facilitate sealing when in other than a right angle position) the right angle seating is preferred for a number of reasons, not the least of which is more positive seating and simplification of fabrication of the plug. In any event, it will be seen that the plane of the plug is substantially parallel to the axis of the rod so that turning of the latter can result in a corresponding turning of the plug while in landed position to bypass fluid as shown in FIG. 3A and in all cases where the plug is to be so turned, the angle between the plug and rod is maintained small enough to permit this.

As will be evident by comparing FIGS. 1 and 3, the operation of the plugger involves moving the plug means from its retracted position in FIG. 1 out through the end of housing 10, through the tapping valve and side opening in the pipe to a final seated position across the pipeline to one side of the opening through the pipeline. To permit this movement, while at the same time preventing escape of pipeline fluid from housing 10 through the opening receiving the carrier rod 12, means are provided for mounting the rod for longitudinal movement into and out of the housing and for rocking movement about a fulcrum and also for sealing between the rod and housing during such longitudinal and rocking movements. In a preferred form, the mounting means also mounts the rod for a combined rocking movement and rotation about its longitudinal axis. This permits the rod to rotate the plug as shown in FIG. 3A, whereby any pressure differential across the plug means can be reduced or equalized to thereby facilitate retraction of the plug means from seated position.

Referring now to FIG. 2, the configuration of the opening in housing 10 through which rod 12 extends is shown in an enlarged view. The illustrated portion of the housnig defining the opening, together with a seal to be described, constitutes a mounting and sealing means for the rod. While this means, except the seal, is shown in an integral part of the housing, it can be a separate part as will be described later. In the embodiment shown in FIG. 2, the housing 10 defines an opening having outer walls 21 and inner walls 22 which flare away from a groove 23. The opening also provides an annulus 24 which closely embraces the rod and this annulus has sufficient width to provide an adequate bearing area for the rod as it is rocked about the fulcrum provided by the annulus, but the width is not sufficient that the rod will bind in the annulus so as to interfere with the rod's rocking movement. The groove is preferably situated so that it has an outer side wall 23a which intersects the annulus and an inner side wall 23b which intersects the sloping wall 21 at a location spaced inwardly of annulus 24 so that the cross section of the opening at such intersection is larger than the corresponding cross section of the carrier rod. Thus, the walls of the opening at annulus 24 have a diameter A which is sufficiently larger than the diameter of rod 12 to provide a clearance permitting longitudinal movement of the rod and yet preventing the seal from being extruded by internal pressure through the clearance, especially during rocking movement of the rod when the clearance will be zero on one side of the rod and at a maximum on the other side. On the other hand, the diameter of the opening at the intersection of the inner wall 23b and wall 22 can have a diameter B which is sufficiently greater than diameter A and of the carrier rod that the latter can be rocked to the necessary extent without binding in the opening. Then, by making the angles C and D at least as large as the angle through which the rod is rocked from vertical, it can be seen that the rod and plug can be positioned as shown in FIG. 1 while at the same time maintaining annulus 24 in closely surrounding relationship with the rod. Further, by making angles C' and D' at least as large as the angle through which the rod will be rocked from vertical to the FIG. 3 position, the rod can be moved to position the plug in seated position while annulus 24 is still maintained closely surrounding the rod. It will be noted that during all of these rocking movements, the annulus provides fulcrum points about which the rod can be rocked.

A suitable resilient seal means is provided in groove 23 and is here illustrated as an O-ring 25. To obtain the most effective seal, O-ring 25 should be oversized with respect to the groove so that when it is installed the rod 12 is vertical, the material of the O-ring will fill the groove to greater extent than is common in conventional design of O-ring seals. Stated another way, the O-ring will substantially fill the groove with the rod in this position. Then, when the rod is rocked to the FIG. 1 position, the O-ring on the right hand side of the rod will tend to expand out of the groove and maintain sealing contact with the rod. On the other hand, the O-ring is small enough with respect to the groove such that when the rod is rocked to the FIG. 1 position, the O-ring portion on the left hand side of the rod will be deformed to substantially fill the groove at that point without being extruded sufficiently so as to be pinched between the rod and the housing so as to destroy its sealing ability.

It will be noted that since pressure in the housing acts to urge the O-ring outwardly, the small clearance between annulus 24 and the rod is such as to prevent extrusion of the O-ring through this clearance in all positions of the rod and the larger clearance between the inner annulus 24a and the rod is not critical in maintaining the O-ring in place in that internal pressure does not act to extrude the O-ring through this larger clearance. Hence, the prime function of inner wall 23b of the groove is to prevent the O-ring from falling from place before the housing is pressurized and from being moved inwardly by the rod when the latter is moved into the housing, particularly when only low pressures are acting against the O-ring.

In order to rock the carrier rod only in the plane of the paper in FIG. 1, it will be seen that the sloping walls 21 and 22 need be provided only on opposite sides of the rod in the plane of its movement. Stated in other words, the shape of the openings at the intersection of the sloping walls 21 and 22 with the inner and outer walls of the housing would then be generally in the form of an oval. However, for reasons outlined below, it is preferred that the walls 21 and 22 slope all around the opening so that they, in effect, define conical portions. Then the intersections of these walls with the inner and outer walls of the housing are in the form of circles. This permits the rod to rock in any chosen plane or through a plurality of planes. For example, when the rod is turned to cause the plug means to move out of unseated position to bypass fluid as shown in FIG. 3A, the rod must have its outer end moved through a curved path so that the rod in effect rocks about its fulcrum in a curved plane. Second, the conical openings permit the housing 10 to be mounted on the pipeline without any particular angular orientation of the housing about its longitudinal axis. For example, the housing can be mounted on the pipeline as shown in FIG. 3 with plug 10a facing down the pipeline. Alternatively, it can be mounted with the plug facing transversely of the pipeline, upstream of the pipeline or in any other angular position. No matter how the housing is angularly oriented, the rod 12 can be turned so that the plug means is properly oriented to be placed in seated position as shown in FIG. 3. All of this is permitted by making the sloping walls 21 and 22 flare all around the opening (e.g. be conical) whereby the rod can be rocked in any direction with respect to the housing and yet annulus 24 remains in closely surrounding relationship with the rod and the seal ring 25 remains in sealing engagement between the rod and housing. The reference to "flare" or "flaring" herein in describing the walls of the opening is meant to include any shape for the walls 21 and 22 which permits the rod to rock about its fulcrum without binding. Thus, the walls in the cross section of FIG. 2 need not be straight as shown but can curve or even be made up of increments which in themselves do not flare but do when taken as a whole.

The outer end of the rod can be provided with any suitable termination for facilitating movement of the rod. In order to reduce the length of the rod and yet provide the requisite mechanical advantage for manipulating the plug means, the outer end of the rod can have a fitting 26 connected thereto in which a tube or rod 27 is slidably received. By making rod 27 of sufficient length, the desired mechanical advantage for rotating or rocking of carrier rod 12 can be achieved. It will be understood that other forms of handle means can be connected to the rod such as the fixed eye and cross bar of the other figures, etc.

Referring now to FIG. 4, there is shown another embodiment of the plugger and one which is particularly suited for use on small pipelines at relatively low pressure, e.g. municipal gas distribution systems. In this embodiment, the housing 10b is shown in the form of a threaded nipple which can be made from a piece of standard pipe. The threads 50 provide connecting means for connecting the housing to a tapping valve which can be of the screw type instead of the flanged, as shown in FIGS. 1–3A. Here again, the carrier rod 12 is fixedly connected to the plug means as by having its lower end bent as shown and threaded to receive a nut 51 which holds the various elements of the plug means in operative relationship to each other.

The mounting means for the rod includes a member such as ball 52 slidably receiving rod 12. Means are provided for mounting member 52 for universal rotation. Such means can comprise upper and lower bearing rings 53 and 54 engaging curved surfaces on the ball 52. The bearing rings can be maintained in support housing 55 in any suitable manner such as by snap rings 56. With this arrangement, it will be seen that ball 52 can turn in any direction responsive to manipulation of rod 12 so that the latter can be rocked about the fulcrum provided by the ball and bearing rings to move the plug means laterally with respect to housing 10b and also to rotate the plug from seated position in order to bypass fluid.

The mounting means includes sealing means which can take the form of O-rings 57 and 58 which, together, provide a seal between the housing and carrier rod.

As indicated above, the plugger of FIG. 4 is particularly adapted for use with low pressures. One installation for such use is shown in FIG. 5 wherein a nipple 60 has been welded to a small diameter pipeline 61. A tapping valve 62, which can be of the screw variety, is mounted on the nipple. Thereafter, a hole is tapped in the pipeline using typical hot tapping procedure, after which the tapping machine is removed and the plugger of FIG. 4 screwed into position. In this connection, it will be noted that the take-up of threads in the FIG. 5 installation may cause the housing 10b to assume different angular orientations (about its longitudinal axis) with respect to the pipeline in different installations. As discussed above, the mounting means permits the carrier rod to be rotated and therefore the plug means can be brought into properly oriented position regardless of the angular position of the housing 10b.

Another embodiment of the invention is shown in FIG. 6 wherein the housing 10c is comprised of a length of pipe 70, a cap 71 and a flange 72, all of which may be stock items. The plug means of FIG. 6 is similar to that of FIG. 1 while the mounting means is similar to that of FIG. 4. The plugger of FIG. 6 is thus adapted to have its housing fabricated from standard pipe fittings and is further especially adapted for use with large diameter pipelines.

In both FIGS. 5 and 6, a cross handle 73 is provided to facilitate actuation of the carrier rod.

FIG. 7 illustrates an installation for bypassing a section of pipeline while the latter is plugged off to permit its repair without shutting down the pipeline. In a typical prior installation of this general type, four hot taps have been made, two upstream of the section to be repaired and two downstream. A bypass line was connected between two of the thus provided side outlets while pluggers were mounted in the other two to plug off the intermediate section of pipeline. The installation shown in FIG. 7 eliminates the need for two hot taps and attendant equipment in that the bypass flow and the plugging occur through the same side outlet. Thus, a split T 80 has been welded to the pipeline to either side of the section 82 to be repaired and tapping valves 83 mounted on the split T's. Thereafter, the pipe is tapped at each location to provide openings 84, the tapping machine removed, valves 83 closed and the L pluggers mounted on the tapping valves. Thereafter, the bypass line can be installed, the valves opened and the plug means landed, all without interrupting flow through the main pipeline. These pluggers are similar to those heretofore described except that the housing 10d has an outlet 84 for connection to the bypass line 85. The housing conveniently can take the form of a standard L. The carrier rod and plug means can be fabricated similar to the ones shown in FIG. 1 if desired. As shown in FIG. 8, a somewhat different mounting and sealing means is employed. In this case, annular ring 86 is constructed with an opening similar to that shown in FIG. 2 and then is slid into housing 10d to be retained therein by suitable means such as snap rings 87. Additionally, a seal such as O-ring 88 is provided between the annular ring and housing.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe plugger of the type having a plug means insertable into a pipe through a side opening in the pipe, comprising a housing mountable at one side of the pipe to provide a fluid tight closure communicating with said side opening, plug means adapted to be moved from the housing through the side opening into the pipe and then laterally therein to provide a fluid barrier across the pipe to one side of said side opening, a carrier rod rigidly connected to the plug means and having a length round in cross-section extending through a circular opening in a wall of the housing, an annular groove in the wall of the opening intermediate the ends of the opening, the opening having conical counterbores extending inwardly from opposite ends thereof to provide walls flaring from the inner and outer side walls of the groove, the diameter of the opening at the outer side wall of the groove being such that the wall of the opening at such locus closely embraces the rod, the diameter of the opening at the inner side wall of the groove being sufficiently larger than that of the rod to permit the latter to rock in said opening, and a resilient seal ring in said groove providing a seal between the rod and said housing.

2. A pipe plugger of the type having a plug means insertable into a pipe through a side opening in the pipe, comprising a housing mountable at one side of the pipe to provide a fluid tight closure communicating with said side opening, plug means adapted to be moved from the housing through the side opening into the pipe and then laterally therein to provide a fluid barrier across the pipe to one side of said side opening, a shaft rigidly connected to the plug means and having a length round in cross-section extending through a circular opening in a wall of the housing, an annular groove in the wall of the opening intermediate the ends of the opening, the walls of the opening flaring on either side of the groove so that the size of the opening adjacent the outer side wall of the groove is such that the rod is closely embraced at such point while the size of the opening at other points along the walls of the opening is larger than the size of the rod to permit the rod to be rocked while being closely embraced by the walls of said opening adjacent said groove, and a resilient seal ring in said groove providing a seal between the rod and said housing.

3. A pipe plugger of the type having a plug means insertable into a pipe through a side opening in the pipe comprising a housing mountable at one side of the pipe to provide a closure communicating with said side opening, plug means including a rigid disc shaped body having a peripheral seal and adapted to be moved from the housing through the side opening into the pipe and then laterally therein to provide a fluid barrier across the pipe to one side of said side opening, a rigid carrier rod directly connected to said body of said plug means by a rigid connection and slidably extending through an opening in the wall of the housing, the walls of said opening at opposite sides of said rod flaring away from the rod leaving only a portion of the walls closely surrounding the shaft so that the latter can be rocked to move the plug means laterally and yet said wall portion will remain closely surrounding the rod during its rocking movement, and a seal ring immediately adjacent said wall portion providing a sliding seal with the rod during its longitudinal and rocking movements.

4. The plugger of claim 3 wherein said walls at each of said opposite sides flare in opposite directions so that said wall portion closely surrounding the rod is situated intermediate the ends of the opening, and an annular groove is situated in said walls adjacent said wall portion, said seal ring being in said groove.

5. A pipe plugger of the type having plug means insertable through a side opening in a pipe comprising a housing mountable at one side of the pipe to provide a closure communicating with said side opening, plug means having a rigid central disc shaped body with a peripheral seal, said plug means being of a cross-section that when the plug means is placed in seated position in and across the pipe to one side of the opening, it forms a fluid tight barrier across the pipe and when rotated from seated position, said seal means becomes ineffective so that fluid can flow from one side of the plug means to the other to tend to equalize any pressure differential thereacross, a rigid carrier rod extending into the housing and directly connected to the body of the plug means by a rigid connection and having its longitudinal axis substantially parallel with the plane of the disc shaped plug means so that the rod can be rotated to rotate the plug as aforesaid, and means providing a sliding and rotating seal between the rod and housing and mounting the rod for longitudinal movement into and out of the housing, also for rocking movement about a fulcrum provided by the mounting and sealing means and further, for rotation whereby the rod can be advanced into the housing to move the plug means through said side opening, rocked about the fulcrum to move the plug means laterally along the pipe to seated position, and rotated to not only assure that the seal becomes effective when the plug means is being seated, but also to render it ineffective to permit pressure to equalize across the plug means before the plug means is to be withdrawn from seated position into the housing.

6. The pipe plugger of claim 5 wherein said mounting and sealing means includes a member having a sliding fit on the rod so that the rod can be moved longitudinally therethrough; means mounting the member on the housing for rotation about an axis transverse to the plane in which the rod is to be rocked; and seals are provided between the member and housing and between the member and rod.

7. A pipe plugger comprising a housing open at one end so that the housing can be mounted to one side of a pipe to communicate with a side opening in the pipe, a rigid carrier rod extending into the housing from the other end, a disc shaped plug means including a rigid central body portion of substantially the diameter of the pipe to be plugged and a peripheral seal carried by the body portion; said carrier rod being directly connected at one end by a rigid connection to the rigid body portion so that the plane of said peripheral seal is substantially parallel to the longitudinal axis of the rod in all positions of the latter whereby the movement of the rod results not only in substantially identical movement of the plug means, but also in a positioning of the plug means identifiable by observation of the position of the rod, said rod being slidably disposed through a sealed pivot mounting at said other end of the housing providing a fulcrum for the rod and mounting the rod for rocking movement about the fulcrum so that by rocking the rod, the plug means can be moved in a direction lateral of the housing, said rod mounting means also providing a sliding connection with the rod so that the latter can move longitudinally of the housing while being rocked about the fulcrum, and seal means providing a seal between the rod and housing during said sliding and rocking movements of the rod, whereby the plug means can be moved out of the open end of the housing by moving the rod into the housing and then laterally of the housing to a seated position to one side of the housing by rocking the rod about the fulcrum.

8. The pipe plugger of claim 7 wherein said sealed pivot mounting also mounts the rod for rotation so that the rod can be rotated to turn the plug from seated position to equalize pressure across the plug before retracting it into the housing.

9. A pipe plugger comprising a housing open at one end so that the housing can be mounted at one side of a pipe to communicate with a side opening in the pipe, a rigid carrier rod extending into the housing from the other end, plug means including a rigid central body portion carrying a peripheral seal and adapted to be moved from within the housing through the open end of the housing to a seated position in the pipe to one side of said side opening in the pipe, said central body portion of the plug means being directly connected to the rod by a rigid connection so that movement of the rod results in substantially identical movement of the plug means whereby the latter can be positively positioned by movement of the rod, said rod being slidably disposed through a sealed pivot mounting at the other end of the housing providing for longitudinal movement of the rod with respect to the housing and for rocking movement of the rod about a fulcrum at said housing's other end while maintaining a sealed relationship between the rod and housing whereby the rod can be moved into the housing to move the plug means therefrom and then rocked about said fulcrum to position the plug means in seated position, all while maintaining a seal between the rod and housing to prevent escape of fluid from the housing.

10. The pipe plugger of claim 9 wherein the means mounting the rod also provides for rotation of the rod relative to the housing so that the plug means can be turned while in seated position to equalize pressure thereacross.

References Cited in the file of this patent

UNITED STATES PATENTS

| 834,393 | Meister | Oct. 30, 1906 |
| 1,946,138 | Gardner | Feb. 6, 1934 |
| 1,988,077 | Goodman | Jan. 15, 1935 |
| 2,262,062 | Strong | Nov. 11, 1941 |
| 2,588,188 | Weisman | Mar. 4, 1952 |

FOREIGN PATENTS

| 94,856 | Norway | Oct. 19, 1959 |